April 25, 1933.  R. P. RASMUSSEN  1,905,422
AIR CONDITIONING APPARATUS
Filed Jan. 15, 1931   2 Sheets-Sheet 1
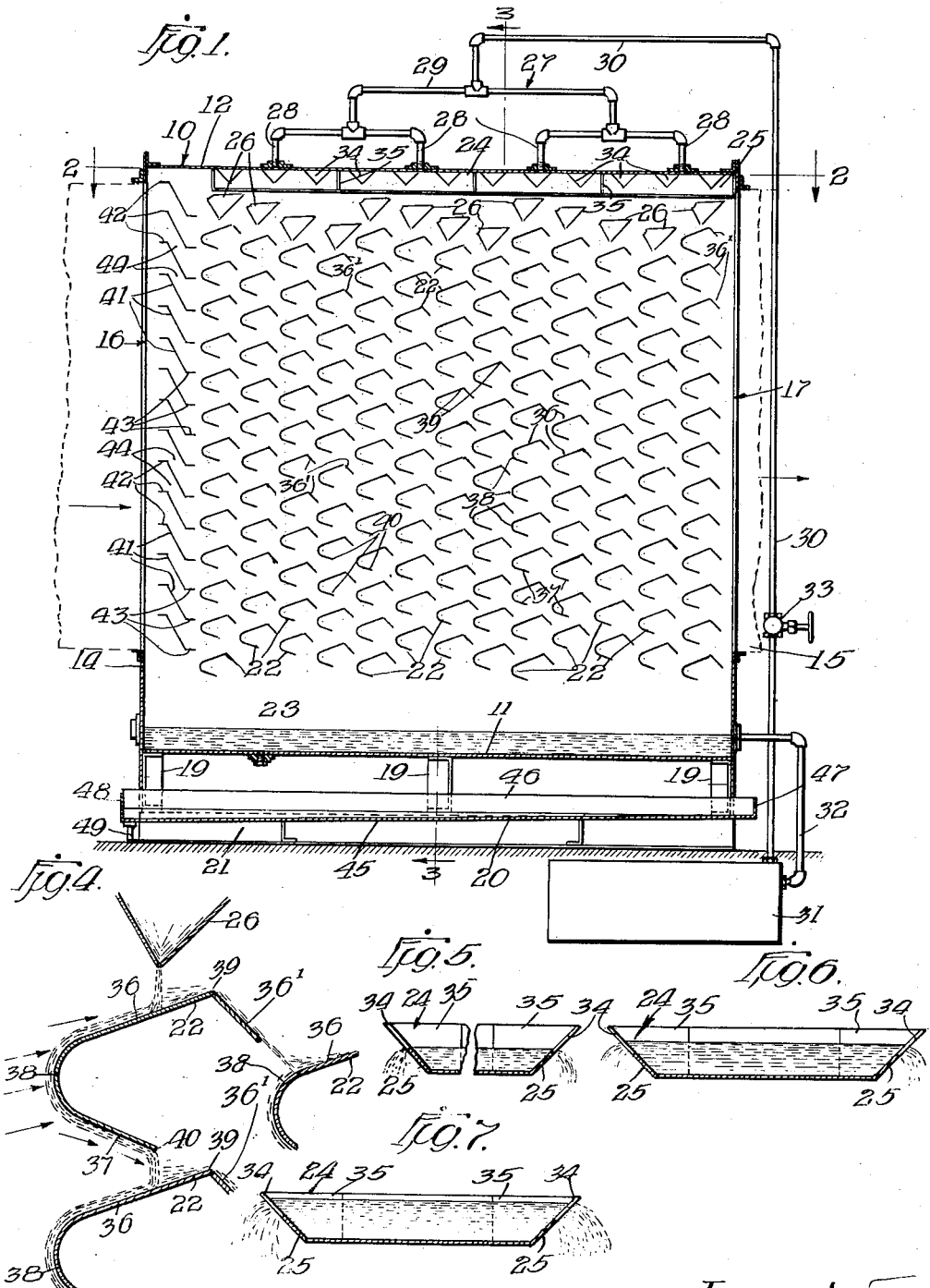

April 25, 1933.  R. P. RASMUSSEN  1,905,422
AIR CONDITIONING APPARATUS
Filed Jan. 15, 1931  2 Sheets-Sheet 2
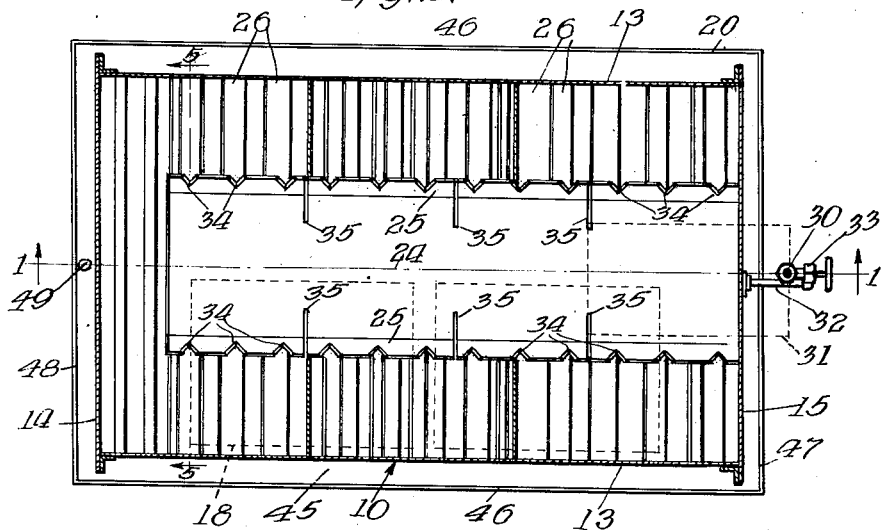
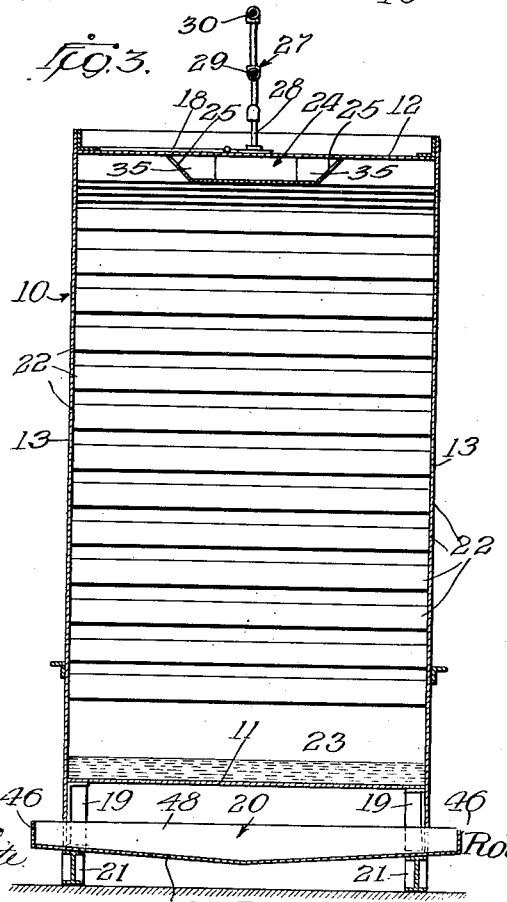
Witnesses:
Harry R. L. White
Robert Cremer
Inventor:
Robert P. Rasmussen
By Edward Fay Wilson atty Patented Apr. 25, 1933

1,905,422

UNITED STATES PATENT OFFICE

ROBERT P. RASMUSSEN, OF CHICAGO, ILLINOIS, ASSIGNOR OF ONE-FOURTH TO EDVALD L. RASMUSSEN AND ONE-FOURTH TO AKSEL F. RASMUSSEN, BOTH OF CHICAGO, ILLINOIS

AIR CONDITIONING APPARATUS

Application filed January 15, 1931. Serial No. 508,913.

This invention relates to improvements in air conditioning means and methods and has special reference to the cooling, washing, humidifying and dehumidifying of air.

The object of the invention is to provide improved means and methods for this purpose, whereby the necessary power will be reduced; the results will be more uniform and satisfactory; the quantity of the water being used can be readily regulated; the distribution of the water will be substantially uniform throughout the conditioner; the air resistance through the conditioner will be reduced; the agitation of the air and water and their intermixing increased; the air flowing through the apparatus directed better against the wet surfaces of the baffles; the drip from the apparatus removed; and generally, the apparatus and its functions improved.

The invention will be readily understood from the following description and appended claims taken in conjunction with the accompanying drawings forming part of this specification and in which:—

Fig. 1 is a vertical central section on the line 1—1 of Fig. 2 of an apparatus embodying my invention and which I have found effective in practicing my improved method;

Fig. 2 is a horizontal section taken on the line 2—2 of Fig. 1;

Fig. 3 is a vertical section taken on the line 3—3 of Fig. 1;

Fig. 4 is an enlarged fragmentary vertical transverse section of the baffles especially illustrating the action of same; and Figs 5, 6 and 7 are detailed sections of the water distributing pan on the line 5—5 of Fig. 2, illustrating the control of the flow of the water.

As shown in the drawings, the apparatus has a casing 10 which is in the form of a rectangular box having a closed bottom 11, a top wall 12, side walls 13 and end walls 14 and 15. The end wall 14 has a large opening 16 for the entrance of the air, and the end 15 has a similar large opening 17 for the exit of the air. In use, the air to be conditioned is either forced or drawn through the conditioner as may be convenient, but, in any event, it flows through the conditioner from the end 14 to the end 15. The top wall 12 has relatively large doors 18 arranged at one side of the longitudinal center line as shown in Fig. 3, and as indicated by dotted lines in Fig. 2.

The casing 10 is supported on suitable legs 19 which are arranged within a drip pan 20 which, in turn, is supported on two longitudinal I-beams 21. The pan 20 is of a size to extend out all around the walls of the casing 10 so that any moisture condensing and dripping from the casing will be caught. Some novel features of the pan 20 will be described later.

As shown, the casing is substantially filled with vertical rows of horizontal drip baffles 22. These baffles are of peculiar and novel shape and arrangement, all of which will be fully described later.

The whole bottom of the casing constitutes a sump 23 to catch the water as it flows down from the baffles 22.

Just below the top 12 of the casing is arranged a water distributing pan 24. As shown, this pan is centrally arranged between the side walls of the casing, it is a little less than half the width of the casing and extends substantially from end to end thereof.

The pan 24 is relatively shallow and has outwardly flared or inclined sides 25. The top of the pan 24 is closed by the top 12 of the casing and the doors 18 give access to it. Beneath the pan 24 are horizontal transversely extending distributing troughs 26, one for each vertical row of the baffles 22, and adapted to deliver the water to the top baffle of each row.

The pan 24 is supplied with water through a water pipe manifold 27 consisting of a plurality of delivery nozzles 28 spaced along the top of the casing and connected in pairs as shown; each pair is connected to a distributing pipe 29 which, in turn, is connected at substantially its middle point by a pipe 30 to the delivery end of a pump 31. The suction end of the pump is connected by a pipe 32 to the sump 23 and the pump is adapted to keep the water in the system in circulation. A hand regulating valve 33 is provided in the pipe 30 for regulating the quantity of water delivered to the pan 24.

The pan 24 is provided with V-notches 34 in its opposite inclined side walls 25. These notches are arranged over the distributing troughs 26 which are thus adapted to be fed at two separated points in their length. The wide sides of the notches 34 are at their tops and their points are at their lower ends. Consequently, as illustrated in Figs. 5, 6 and 7, the higher the water level is maintained in the pan, the more water will flow out through the notches.

I have found that a very fine graduation or adjustment of the quantity of water used and its uniform distribution can be maintained by means of this construction.

As shown, the pan 24 is fed at four places in its length by the four nozzles 28. There is sometimes a tendency for the water to flow longitudinally of the sides of the pan and if allowed to do so, would disturb the uniform distribution so necessary for the proper operation of the apparatus.

To prevent such longitudinal flow of the water in the pan 24, I provide thin baffle plates or walls 35 extending out from the side walls 25 at intervals. These baffles 35 extend from the bottom to the top of the pan but only part way across the pan. They do not hinder the general flow of water in the pan 24 but just along the side walls thereof.

As explained herein before, each vertical row or stack of the baffles 22 has a water distributing trough 26 above it which is adapted to cause the water to fall upon the uppermost baffle of a stack and the water runs or drips down off of the top baffle onto the next lower one and so on down the whole stack, the unabsorbed water falling down into the sump 23 at the bottom.

The baffles 22, as has been stated, are novel and peculiar in form and arrangement.

Each baffle 22, as best shown in Fig. 4, is made of a strip of sheet metal bent along a longitudinal line into a somewhat V-shape, having a long side 36 and a shorter side 37 and these two sides are connected by a rounded portion 38 of relatively large radius. The baffles 22, as stated, are arranged horizontally and in stacks, one above the other. The long sides 36 are above and the shorter sides 37 are at the bottom, and the rounded connecting part 38 is at one side and is directed toward the incoming air so that the stream of air strikes the rounded sides and divides, part flowing slightly upwardly along the upper walls 36 and part along the lower walls 37.

The rear edge portion 36' of the upper longer side 36 of each baffle 22 is bent downwardly to provide a downwardly and rearwardly inclined baffle flange which projects toward the forward rounded edge portion of the adjacent baffle in the next adjacent row of baffles. The baffles are formed, arranged and adapted to cause a desired amount of turbulence in the flowing air to cause it to impinge as directly as possible against the wet surfaces of the baffles, thereby resulting in the desired wetting, washing and humidifying of the air while impeding its flow through the apparatus the least possible amount consistent with the results desired.

It will be seen from Fig. 4 that the air is directed almost normally against the forward rounded edges 38 of the baffles, that it is divided by this rounded edge so that part flows upwardly over and in contact with the long sides 36 and the water flowing down same, and part downwardly along the shorter inclined sides 37 of the baffles and in contact with the water flowing down same. It will be seen from Fig. 4 that some of the water flowing down off of one baffle onto the next lower baffle will be carried by the flowing air over the upper edge of the longer side 36 and that this water will flow down the rear downwardly inclined edge portion 36'.

It will also be seen that any water which is carried over and flows down the edge part 36' of the baffles will drip off freely and will not be inclined to follow down on the inner surface of the baffle but will rather be carried along with the flowing air onto the next lower baffle in the next row.

Furthermore, the downwardly inclined rear edge portion serves to contract the air passages between the baffles and not only force the flowing air into close contact with the next adjacent baffles, but also provide a sequence of surfaces arranged at angles to each other which cause the flowing air to whirl more or less and thus be brought into more intimate contact with the water on the baffles, all of which tends to more perfect results in desired conditioning of the air and a reduction of the required power.

In Fig. 4 I have illustrated the action of the air on the water by the several arrows. The water falls onto the upper walls 36 at a line slightly forward of the upper edge 39 of this wall and gravity causes it to flow forward down this wall and around the rounded part 38 and down the lower wall 37, thus presenting a relatively large surface or film of water with which the air contacts.

The water drips off of each baffle at the rear edge 40 of the short lower wall 37 onto the upper long wall 36 of the next lower baffle. The angle of these sides is preferably approximately 22½ degrees spread, which I have found to give good results.

As shown in Fig. 1, between the end wall 14 of the casing and the first row of the baffles 22 is arranged a vertical series of splash plates 41. These plates are each downwardly inclined and each has a horizontally extending edge 42 directed toward the incoming air and a horizontally extending edge 43 projecting toward the baffles 22. These plates overlap each other and effectively prevent any water splashing out of the entrance opening 16; they also tend to direct the air horizontally against the baffles 22.

The baffles, as explained, are arranged in vertical stacks and are separated vertically to afford ample air passages 44 between them.

The flowing air, in passing the baffles, is directed both upwardly and downwardly past the inclined sides 36 and 37 but as the lower walls are shorter than the adjacent upper walls, the tendency of the streams of air flowing between the baffles is to be deflected slightly upwardly against the rounded edges 38 of the next adjacent stack of baffles which are staggered vertically in relation to the next preceding stack, so that the streams of air flowing through between the baffles in one stack will strike fairly against the rounded forward edges of the baffles in the next stack.

As shown, this vertical staggering of the baffles 22 results in an arrangement of the baffles in the casing in groups of four stacks, the several topmost baffles in a group being arranged in a slightly downward inclined relation.

Also, the troughs 26 are placed at a uniform height above the topmost baffles of each stack and are, consequently, also arranged in downwardly inclined groups of four.

The arrangement of baffles, as shown and described, results in a maximum contact of water and air and allows free passage of the air through the casing, thus absorbing a minimum of power for this purpose.

The drip pan 20, as has been explained, is larger in horizontal area than the casing so that it can project all around and effectively catch all drip.

The pan 20 is shallow and its bottom 45 is inclined from the sides 46 toward the middle, as shown in Fig. 3, and it is also inclined longitudinally from one end 47 toward the other end 48, as shown in Fig. 1. This formation of bottom effectively drains all of the drip to the middle of one end of the pan and a drain pipe 49 can be connected at this point. A pan thus constructed will freely drain even though the floor upon which the machine is placed is not exactly level.

As many modifications of the invention will readily suggest themselves to one skilled in the art, I do not limit or confine the invention to the specific details of construction or combination of parts herein shown and described.

I claim:

1. In an air conditioner of the kind described, a plurality of vertical stacks of baffles, each baffle being formed of sheet metal formed to provide an upwardly inclined top surface and a downwardly inclined lower surface, the two joined at their forward edges, the lower surfaces being narrower than the upper surface and the upper surface terminating in a downwardly inclined flange.

2. In an air conditioner of the kind described, a plurality of vertical stacks of baffles, the baffles of one stack being staggered in relation to the next adjacent stacks, each baffle being formed of sheet metal formed to provide an upwardly inclined top surface and a downwardly inclined lower surface, the two joined at their forward edges, the lower surface being narrower than the upper surface, the rear edge portion of the upper surface bent downwardly and terminating beyond the rear edge of the lower surface.

3. In an air conditioner of the kind described, a plurality of vertical stacks of baffles, each baffle being formed of sheet metal formed to provide an upwardly inclined top surface and a downwardly inclined lower surface, the two joined by a rounded part forming the forward edge of the baffle, the lower surface being narrower than the upper surface, the longer upper sides of the baffles terminating in downwardly inclined narrow flanges, as and for the purpose specified.

4. In an air conditioner of the kind described, a plurality of vertical stacks of baffles, the baffles of one stack being staggered in relation to the next adjacent stacks, each baffle being formed of sheet metal formed to provide an upwardly inclined top surface and a downwardly inclined lower surface, the two joined by a rounded part forming the forward edge of the baffle, the lower surface being narrower than the upper surface, the longer upper sides of the baffles terminating in downwardly inclined narrow flanges, as and for the purpose specified.

5. A baffle element for use in an air moistener consisting of sheet metal formed to provide a relatively wider upper inclined surface and a relatively narrower lower surface and a downwardly inclined flange at the rear edge of the upper surface.

6. A baffle element for use in an air moistener consisting of sheet metal formed to provide a relatively wider upper inclined surface and a relatively narrower lower surface joined by a rounded forward edge, the longer upper side of the baffle terminating in a downwardly inclined narrow flange.

7. In an air conditioner of the kind described, a plurality of vertical stacks of baffles made in accordance with claim 5, the baffles of the successive stacks being relatively staggered as and for the purpose specified.

8. In an air conditioner of the kind described, a plurality of stacks of baffles, each baffle having a wider upwardly inclined upper surface terminating at its rear edge in a downwardly inclined edge portion, and a lower narrower downwardly inclined surface, the two surfaces joined at their forward edges, the baffles arranged in the stacks so that the downwardly inclined rear edge portion of one baffle directs water upon the wider upper surface of a baffle in the next stack.

In testimony whereof, I have hereunto set my hand this 18th day of December, 1930.

ROBERT P. RASMUSSEN.